(12) United States Patent
Lynn et al.

(10) Patent No.: US 8,732,185 B1
(45) Date of Patent: *May 20, 2014

(54) SELECTING CONTENT FOR PUBLICATION

(75) Inventors: Nicholas Lynn, Mountain View, CA (US); Alexander P. Carobus, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/607,947

(22) Filed: Sep. 10, 2012

Related U.S. Application Data

(63) Continuation of application No. 12/100,645, filed on Apr. 10, 2008, now Pat. No. 8,285,737.

(51) Int. Cl.
*G06F 17/30* (2006.01)
*G06F 15/16* (2006.01)

(52) U.S. Cl.
USPC .......................................... 707/765; 707/750

(58) Field of Classification Search
USPC ................................. 707/765, 750
See application file for complete search history.

(56) References Cited

U.S. PATENT DOCUMENTS

| | | | |
|---|---|---|---|
| 5,794,210 A | 8/1998 | Goldhaber et al. | |
| 6,401,075 B1 | 6/2002 | Mason et al. | |
| 6,907,566 B1 | 6/2005 | McElfresh et al. | |
| 7,028,029 B2 | 4/2006 | Kamvar et al. | |
| 7,035,812 B2 | 4/2006 | Meisel et al. | |
| 7,076,443 B1 | 7/2006 | Emens et al. | |
| 7,089,195 B2 | 8/2006 | Rosenberg | |
| 7,136,875 B2 | 11/2006 | Anderson et al. | |
| 7,203,749 B2 | 4/2007 | Hiraga | |
| 7,333,941 B1 | 2/2008 | Choi | |
| 7,353,235 B2 | 4/2008 | Sally et al. | |
| 2002/0029186 A1 | 3/2002 | Roth et al. | |
| 2002/0116463 A1 | 8/2002 | Hart | |
| 2002/0194113 A1 | 12/2002 | Lof et al. | |
| 2003/0014331 A1 | 1/2003 | Simons | |
| 2003/0046161 A1 | 3/2003 | Kamangar et al. | |
| 2003/0115187 A1 | 6/2003 | Bode et al. | |
| 2004/0019523 A1 | 1/2004 | Barry et al. | |
| 2004/0044571 A1 | 3/2004 | Bronnimann et al. | |
| 2004/0260924 A1 | 12/2004 | Peled et al. | |
| 2004/0267612 A1 | 12/2004 | Veach | |
| 2005/0055271 A1 | 3/2005 | Axe et al. | |
| 2005/0096979 A1 | 5/2005 | Koningstein | |
| 2005/0096980 A1 | 5/2005 | Koningstein | |
| 2005/0108325 A1 | 5/2005 | Ponte | |
| 2008/0275869 A1* | 11/2008 | Herberger et al. ................ 707/5 |

OTHER PUBLICATIONS

'The Direct Hit Popularity Engine Technology A White Paper' [online]. Direct Hit, [retrieved on Mar. 14, 2009]. [Published Feb. 18, 2001] Retrieved from the Internet: http://web.archive.org/web/20010218031152/directhit.com/about/products/technology_whitepaper.html , 7 pages.

(Continued)

*Primary Examiner* — Alex Gofman
(74) *Attorney, Agent, or Firm* — Fish & Richardson P.C.

(57) ABSTRACT

Among other disclosed subject matter, a computer-implemented method relating to selecting content for publication includes receiving a term to be used in selecting content for publication. The method includes obtaining information from a record using the received term, the information reflecting a correspondence between contents in a repository and the received term. The method includes determining, using at least the obtained information, a query to be performed on the repository for selecting at least part of the content.

20 Claims, 4 Drawing Sheets

(56) References Cited

OTHER PUBLICATIONS

'Kanoodle Joins Contextual Advertising Fray' [online]. Search Engine Watch, May 18, 2004, [retrieved on Mar. 22, 2008]. Retrieved from the Internet: http://scarchenginewatch.com/showPage.html?page=sew_print&id=3327651, 3 pages.

'Online Ads Lucrative for SMBs' [online]. Small Business Trends, Oct. 27, 2003, [retrieved on Mar. 22, 2008]. Retrieved from the Internet: http://www.smallbiztrends.com/2003/10/online-ads-lucrative-for-smbs.html/print/ , 1 page.

* cited by examiner

```
305 { total_ads=0
      num_tokens_used=0
310 { for (int i = 0; i < available_tokens.size(); i++)
    {
315 {   Token this_token = availabe_tokens[i]
        Token extra_token = NULL
        int num_hits = lookup(this_token)

if (num_hits <= max_hits_per_token)
        {
320 {       add_single_token_to_query(this_token)
            total_ads += num_hits;
            num_tokens_used += 1;
        }
        else
        {
            if (extra_token == NULL)
            {
325 {           extra_token = tok1;
            }
            else
            {
                //combined 2-token query
                num_hits = lookup(this_token, extra_token)
330 {           add_double_token_to_query(this_token, extra_token)
                total_ads += num_hits;
                extra_token = NULL;
                num_tokens_used += 2;
            }
        } if (total_ads >= target_ads || num_tokens_used >= max_tokens_to_use)
335 {   {
            break;
        } if (total_ads < target_ads && extra_token != NULL)
340 {   {
            add_single_token_to_query(extra_token)
        }
    }
```

FIG. 3

SELECTING CONTENT FOR PUBLICATION

CROSS-REFERENCE TO RELATED APPLICATION

This patent application is a continuation of patent application Ser. No. 12/100,645, filed Apr. 10, 2008, and entitled "Selecting content for publication," the entire contents of which are hereby incorporated herein by reference.

TECHNICAL FIELD

This document relates to selecting content for publication.

BACKGROUND

Advertising in online mediums have some similarities with traditional print-based advertising. For example, it is usually desirable to target the advertisement to the intended or expected audience, because advertisers generally prefer to invest in advertising if it reaches many potential customers, as opposed to persons who have little or no interest in the product or service being advertised. In print media, this targeting could be based on the general knowledge about who the readers are, or market investigations can be performed on the readers to more accurately determine their interests.

In the online environment, publishers sometimes try to match the advertisement displayed on a page to the particular page as well as possible. Sometimes the matching involves determining one or more terms relating to the page and using this term to select one or more advertisements to be included in the page.

SUMMARY

The invention relates to selecting content.

In a first aspect, a computer-implemented method relating to selecting content for publication includes receiving a term to be used in selecting content for publication. The method includes obtaining information from a record using the received term, the information reflecting a correspondence between contents in a repository and the received term. The method includes determining, using at least the obtained information, a query to be performed on the repository for selecting at least part of the content.

Implementations can include any, all or none of the following features. The record can include a lookup table that associates at least multiple terms with respective numbers for how many of the contents in the repository match the respective one of the multiple terms in a search. The method can further include generating the lookup table by performing searches using the multiple terms. Performing the searches can include: obtaining the multiple terms; for each of the multiple terms, querying the repository; and recording the respective numbers for at least some of the multiple terms in the lookup table. The method can further include determining that the respective number of contents matching at least a first one of the multiple terms is below a threshold; and assigning a default value to the first one of the multiple terms. The method can further include, for any of the multiple terms not assigned the default value, forming combinations of the respective term with each of the other ones of the multiple terms; determining a number for how many of the contents of the repository match each of the respective combinations; and updating the lookup table with the determined number. The searches can take into account a restriction on the selection of content for publication. The restriction can be at least one selected from the group consisting of: a content-based restriction, a geographical restriction, a language-based restriction, and combinations thereof. Obtaining information from the record can include: looking up the received term in the record and identifying the information in the record associated with the received term; and determining whether a number included in the identified information is at most equal to a predefined maximum number of hits per term. The number can be at most equal to the predefined maximum number, and the method can further include updating the record with the number associated with the received term. The number can be higher than the predefined maximum number, and the method can further include forming a combination of the received term with at least another received term. The method can further include using the combination in determining the query. A minimum total number and a maximum total number of contents can have been established, and the method can further include determining a total number of how many of the contents match respective terms being processed; causing an interruption upon determining that the total number is at least equal to the maximum total number of contents; and causing an interruption upon determining that the total number after processing a predetermined number of terms is lower than the minimum total number of contents. The repository can be an advertisement repository, the contents can be advertisements, and the term can be obtained as relating to a publisher's page to select at least one of the advertisements in the repository for placement on the publisher's page.

In a second aspect, a computer program product is tangibly embodied in a computer-readable storage medium and includes instructions that when executed by a processor perform a method relating to selecting content for publication. The method includes receiving a term to be used in selecting content for publication. The method includes obtaining information from a record using the received term, the information reflecting a correspondence between contents in a repository and the received term. The method includes determining, using at least the obtained information, a query to be performed on the repository for selecting the content.

In a third aspect, a computer system includes a repository including contents to be selected for publication. The system includes a record indicating a correspondence between the contents and at least one received term. The system includes a content selection module that, upon receiving the term, obtains information from the record using the received term and determines a query to be performed on the repository.

Implementations can provide any, all or none of the following advantages. More effective distribution of content can be provided. Advertisements can be selected for publication more efficiently. A process for selecting advertisements based on a term can be improved by using a record reflecting a correspondence between the term and available advertisements. Query formulation for use with an advertisement database can be improved by taking into account previously established statistical correlations between at least one term of the query and content in the advertisement database.

The details of one or more embodiments are set forth in the accompanying drawings and the description below. Other features and advantages will be apparent from the description and drawings, and from the claims.

DESCRIPTION OF DRAWINGS

FIG. 3 illustrates a set of example pseudo-code that can perform query prediction for serving contents such as advertisements.

Like reference symbols in the various drawings indicate like elements.

DETAILED DESCRIPTION

Figure 1:
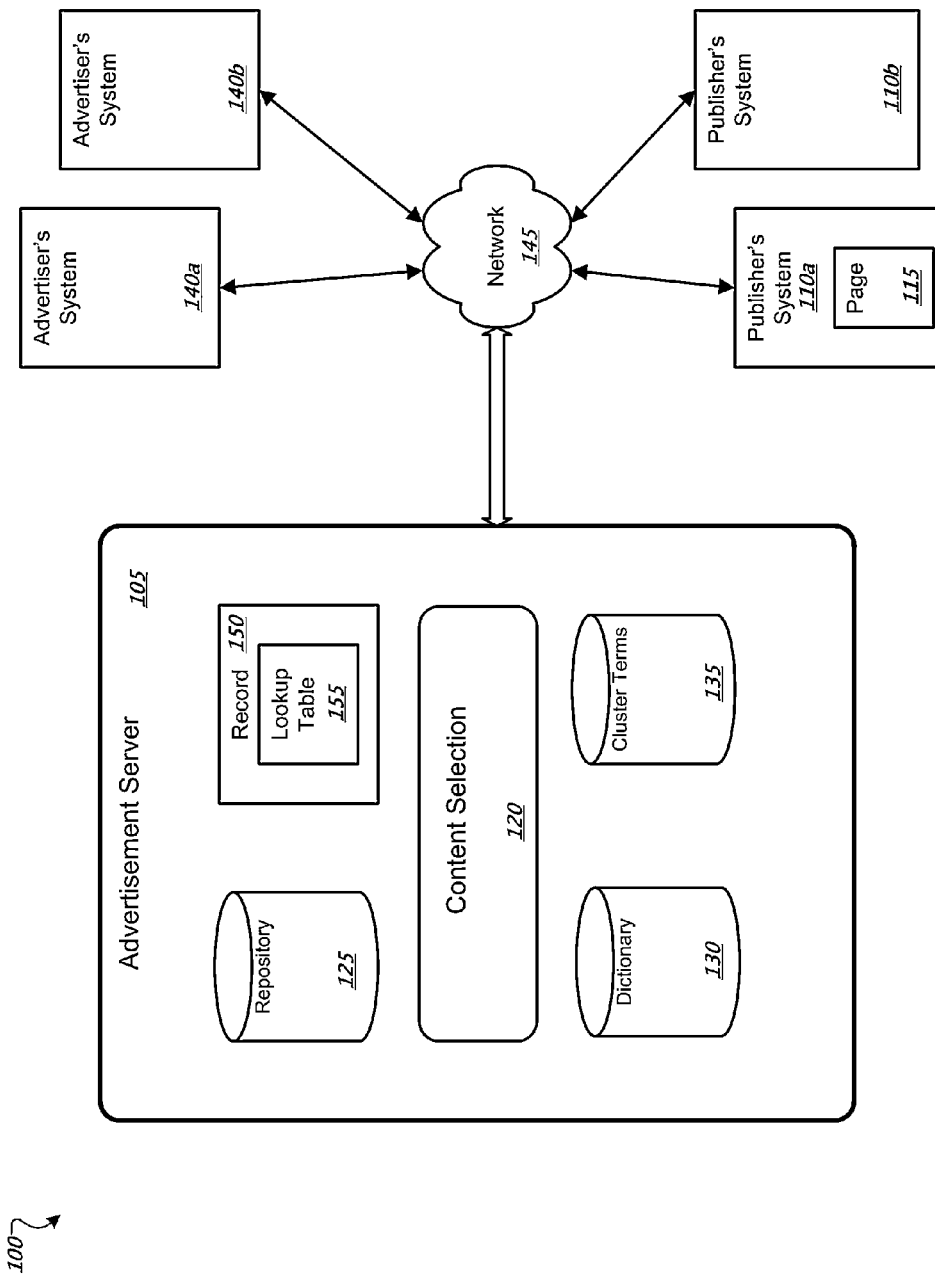
FIG. 1 illustrates an example system that can perform query prediction for serving contents such as advertisements.

FIG. 1 illustrates an example system 100 that can perform query prediction for serving contents such as advertisements. In general, a publisher of electronic content may wish to have the publication of their electronic content enhanced by also introducing other content such as advertising content. For example, a publisher may display advertisements on a web page to generate revenue. It may therefore be beneficial to determine a collection of advertisements that may be relevant to the content of the page that users are to view. The system 100 in some implementations processes electronic content to determine a collection of content such as one or more advertisements that may be potentially relevant to the publisher's electronic content, and associates the potentially relevant advertisements or other content with the electronic content for publication to a user. Particularly, below will be described examples of how a query for retrieving one or more relevant ads for publication can be formulated using information in a record. In other implementations, content other than advertisements can be identified and/or served for publication.

An advertisement server 105 in this example processes the electronic content to be published and/or served by one or more publisher's system, such as a publisher's system 110a and/or a publisher's system 110b. The electronic content, such as a page 115, is processed by a content selection module 120 to detect one or more keywords, phrases, and/or keyword clusters in the electronic content. In some implementations, such keyword(s) can also or instead be obtained from another source, such as directly from the advertiser. The content selection module can use the keywords, phrases, and/or keyword clusters for the page 115 to find one or more advertisements that are likely to relate to the content of the page 115. In some embodiments, the electronic content from the publisher (e.g., page 115) may be a web page, but in other embodiments the electronic content may be other types of electronic documents (e.g., XML files, word processing files, Adobe Acrobat (PDF) files, ASCII text), news feeds (e.g., RSS, Atom), audio files, video files, applications embedded in web pages (e.g., Java applets, ActiveX controls), Adobe Flash content, or any combinations of these and/or other types of electronic content.

The advertisement server in this implementation includes a repository 125 of advertisement content, a dictionary database 130, and a cluster terms database 135. The repository 125 includes information corresponding to a collection of advertising data that is supplied by one or more advertiser's server(s), such as the advertiser's system 140a and an advertiser's system 140b. In some embodiments, the advertising data may include web addresses, product information, keywords, graphical elements (e.g., ad banners), or combinations of these and/or other data that may be used to describe an electronic advertisement. In some implementations, the contents may be stored elsewhere and/or in another form, such as in a common repository.

The advertisers' systems 140a and 140b, the publishers' systems 110a and 110b, and the advertisement server 105 can be in communication through any kind of network 145. For example, the advertising server 105 may communicate with the advertisers' systems 140a and 140b to obtain information that may be stored in the repository 125. In some embodiments, the network 145 may be a public network such as the Internet, a private network, a cellular data network, or other network that may be used to carry electronic content and advertising data.

The dictionary database 130 includes a collection of terms that may be used to query the repository 125. For example, the dictionary database 130 may be a general-purpose dictionary that includes all or a substantial portion of the words in one or more languages. In some embodiments, the dictionary database 130 may include words from a single language. In yet other embodiments, the dictionary database 130 may include a collection of words that have been previously selected. The cluster terms database 135 includes information about combinations and/or groupings of words from the dictionary database 130 and/or other sources. In some implementations, one or more cluster terms can be used, given an initial keyword, to expand the keyword collection with other words relating to the same concept. For example, a cluster relating to the concept of baking can include terms such as cookie, loaf, bread, oven, ingredients, and so on. As another example, text that includes the word "dog" may be associated with a number of different meanings. A cluster of the words "dog," "hot," and "bun" may relate to food, whereas a cluster of the words "dog," "hot," and "pant" may relate to pets.

The advertising system 105 here contains a record 150 that in this example includes a lookup table 155. The lookup table 155 here includes a collection of keywords and each keyword has a number associated with it representing how many hits may be obtained in the repository 125 when searching by the keyword.

The following is an example of how the record 150 can be generated. In some embodiments, the content selection module 120 may use entries in the dictionary database 130 to query the repository 125 to determine a number of hits to be associated with respective keywords. For example, the content selection module 120 may select the word "genealogy" from the dictionary database 130 and use the word to query the repository 125. The query may return information that indicates that four-hundred advertisements may be associated with the word "genealogy" (e.g., search "hits"). The content selection module 120 may associate the word "genealogy" with the number "400" and store that information in the record 150.

In some embodiments, the content selection module 120 may also or instead generate the record 150 from entries in the cluster term database 135. For example, the content selection module 120 may use entries in the cluster terms database 135 to query the repository 125 to determine a number of hits to be associated with the cluster terms. For example, the cluster terms database 135 may include an entry that clusters the terms "nail," "screw," "bolt," and "rivet." The content selection module 120 may use the cluster to query the repository to determine a number of advertisements that may relate to the subject of fasteners, and store that information in the record 150.

The following is another example of how the record 150 can be generated. In some embodiments, the content selection module 120 may use combinations of two or more entries in the dictionary database 130 and/or the cluster terms database 135 to query the repository 125 to determine a number of hits that may be associated with the combined keywords and/or cluster terms. For example, the content selection module 120 may select a first term and a second term from the dictionary database 130, and query the repository 125 to determine the number of hits that may relate to the first term and the second term (e.g., a logical AND query). In another example, the content selection module 120 may query the repository 125 to determine the number of hits that may relate to the first term or the second term (e.g., a logical OR query). Other search combinations of two or more terms can be used to create entries for the record 150.

The query returns a number that represents the quantity of advertisements that may be related to the selected term, and the returned number can be compared to an upper limit and a lower limit. In some examples, the returned number may exceed the upper limit, which may indicate that the single term may be too broad (e.g., related to too many advertisements). In other examples, the returned number may not satisfy the lower limit, which may indicate that the single term may be too narrow (e.g., related to too few advertisements).

In some implementations, queries may be performed on the repository 125 to narrow the number of ads that may be related to the terms used in the search. For example, a look up of the term "water" may return a number that indicates that 50000 ads may be related to the term (e.g., ads for bottled water, environmental advocacy, plumbing), while a look up of the term "craft" may return a number that indicates that 30000 ads may be related to the term (e.g., ads for craft shops, woodworking tools, magicians, spacecraft). Individually, either term may exceed the upper limit (e.g. 20000 hits). By combining the terms "water" and "craft" in a query of the repository 125 (e.g., a logical AND query), the query may return a number that indicates that a reduced number of ads may be related to both terms (e.g., ads for boats, canoes, kayaks) and store that information in the record 150.

In some implementations, queries may be performed on the repository 125 to expand the number of ads that may be related to the terms used in the search. For example, a value of 1500 may define the lower threshold. A look up of the term "nanotube" may return a number that indicated that the term is associated with two hundred ads, which is below the 1500 hit lower limit of this example. Another look up that uses the term "carbon" may determine that nine hundred ads may be associated with the term. The content selection module 120 may perform a query of the combined terms "carbon" and "nanotube" on the repository 125 (e.g., a logical OR query) to determine a number that indicates the quantity of ads that may be related to either of the terms and store that information in the record 150.

In some implementations, this process is performed for a large number of words, clusters, and/or combinations of terms, for example obtained from the dictionary 130 and/or the cluster terms database 135, so that the record 150 forms a comprehensive catalog of useful words, clusters, and combinations of terms, and a number of the advertisements each one corresponds to. At a later time, the number listed in the record 150 for a particular term or terms can be viewed as an approximation of the number of hits that may be obtained if the repository 125 were queried using that term or terms. The number can be approximate because the state and/or contents of the repository can change over time and therefore so can the number of responsive advertisements.

In some embodiments, the content selection module 120 may use the table 155 to look up search terms and/or clusters that relate to the page 115. The content selection module 120 can communicate with the publisher's system 110a to read the page 115 and/or other data. The content selection module 120 may analyze the electronic content of the page 115 and/or other data to detect one or more terms to be used for the page 115. In some embodiments, the content selection module 120 may analyze the page 115, a descriptor file (e.g., metadata, a predefined list of terms), or a combination of these and/or other sources of terms that may relate to the content of the page 115.

For example, a user may request the page 115, and the content selection module 120 may analyze the page 115 and/or associated data to determine one or more terms. The content selection module may use the terms associated with the page 115 to look up entries in the table 155 to find approximately a number of advertisements that that are responsive to the term(s). Based on this information, an appropriate query for advertisements can be formulated. The content selection module 120 can use the formulated query to search for advertising content in the repository 125 and associate that content with the requested page 115 (e.g., embedding links to advertisers' web pages, adding banner ads, triggering pop-up ads). The content selection module 120 may then deliver the requested page 115 and advertisements to the user.

In some embodiments, terms, clusters, and/or combinations of terms that are detected in the page 115 and/or other data may be ranked to indicate their relevance to the content of the page 115. For example, terms that occur often in the page 115 may imply the general subject matter of the page 115. In another example, detected terms that have been previously identified as being unique or important (e.g., trademarks, proper nouns, jargon, technical terms, scientific or medical names) may be ranked differently from more common words or phrases. The content selection module may use the ranked terms, clusters, and/or combinations to determine an order in which to look for information in the table 155.

In some examples, an entry that associates a number with a given term or set of terms found in the page 115 may be absent from the table 155. The content selection module 120 may use the terms to query the repository 125 to determine a number of ads that may be related to the terms and save that information to the record 150. The content selection module 120 may also use combinations of terms found in the page 115 to query the repository 125, and save that information to the record 150.

In some implementations, the query is formulated essentially in real time when the content such as advertisements is to be retrieved from the repository and provided for publication. As another example, the content selection module 120 may save information that relates the page 115 to a particular search term, cluster, or combination of terms. For example, the content selection module 120 may analyze the page 115 and/or associated information, and use that information to run one or more look-up operations on the table 155. When a term, cluster, or combination of terms if found that is associated with a number that falls between the upper and lower hit limits, the content selection module 120 may associate the term, cluster, or combination of terms with the page 115 by adding or updating an entry in the lookup table 155. For example, the module 120 formulates a query to be used when advertisements are to be selected for the page 115, and stores that query for future use, for example in the table 155. That is, in these implementations, one or more queries can be formulated ahead of time and be used (and optionally reused) at a later time. In some embodiments, the table 155 may include information about the page 115 (e.g., address, location, publisher), keywords and/or clusters included in the page 115, search queries, search terms, numbers of hits associated with one or more search queries, or combinations of these or any other information that may describe the results of query operations. In other implementations, the module 120 can store the information elsewhere than in the record 150.

In some implementations, the content selection module 120 may use entries in the table to look up an entry that is related to the page 115 and use that information to associate advertisements with the page 115. For example, a user may request the page 115, and the content selection module 120 may look up an entry for the page 115 in the table 155. The entry may include a pre-formulated query and/or a predetermined term, cluster, or combination of terms that may be used to query the repository 125 and return a collection of ads that may be associated with the page 115 and served to the user.

In some implementations, the content selection module use other information in addition to the information detected and/or associated with the page 115 to determine a number of advertisements that may be associated with the page 115. For example, a scope of collecting ads may be narrowed by content, geographical location, language, time of day, date, season, conditions at the user's location, demographic data associated with the user, or combinations of these and any other information. For example, the content selection module 120 may narrow ad collection by serving mostly or only German-language ads to users in primarily German-speaking geographic areas. In another example, users located near the city of Minneapolis may be shown advertisements for businesses in or near Minneapolis, but not for businesses in or near Denver.

Figure 2:
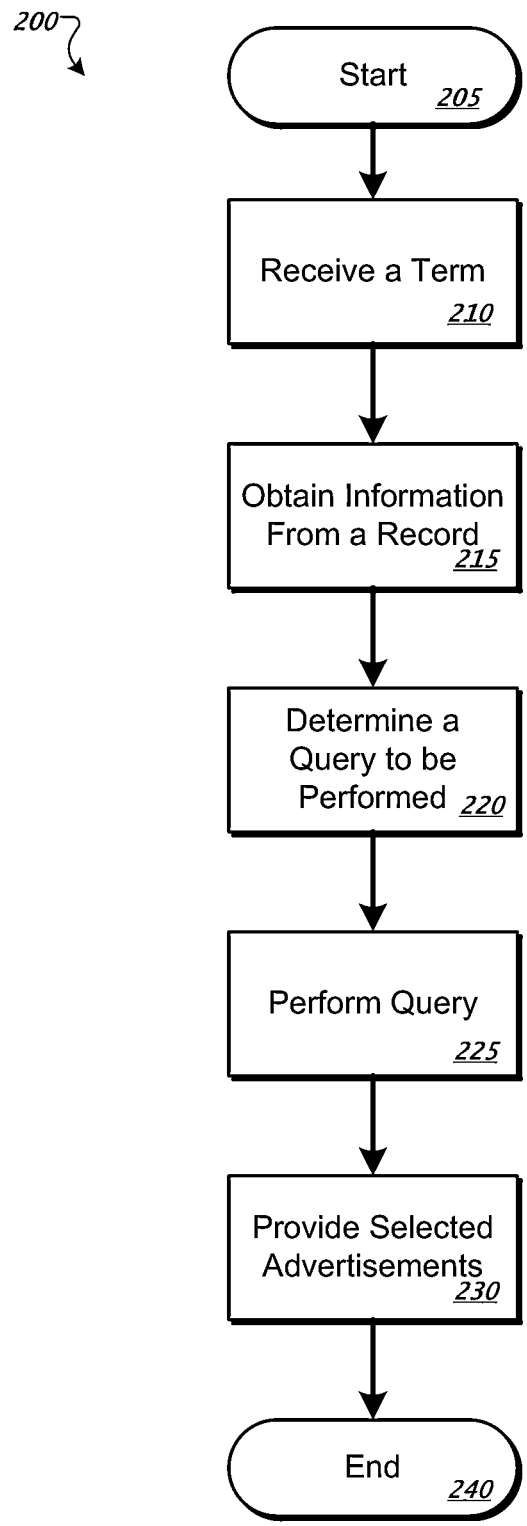
FIG. 2 illustrates a flow diagram of an example process that can perform query prediction for serving contents such as advertisements.

FIG. 2 illustrates a flow diagram of an example process 200 that can perform query prediction for serving contents such as advertisements. In some implementations, the process 200 may be executed by a processor executing instructions stored in a computer-readable medium, for example the content selection module 120 of FIG. 1. The process 200 starts at step 205. In some implementations, the process 200 can be started by: initiation by a user request, a trigger, a timer, or other action that may be used to initiate a process. For example, the content selection module 120 may run the process 200 once per day, week, month, or any other interval. In some implementations, the process 200 may be run any number of times for any number of terms. For example, the process 200 may be run once for each term in the database 130.

At step 210, a term to be used in selecting content for publication is received. In some implementations, the content selection module 120 may receive the term by processing entries in a dictionary database (e.g., the dictionary database 130) or a cluster terms database (e.g., the cluster terms database 135). In some implementations, the term may be received by analyzing the electronic content of the page or other source (e.g., linked documents or other files, streaming media content) to determine one or more terms that may be related to the content of the page.

At step 215, information from a record is obtained using the selected term. In some implementations, the information may include the term and a number that corresponds to content in the repository. For example, the term may be used in a look-up operation run on a table (e.g., the table 155) to find an entry that indicates the number of advertisements in the repository that may relate to the term.

At step 220, the obtained information is used to determine a query to be performed. In some implementations, a single term may be used. For example, the number associated with the term may indicate that a query of an advertisement repository database (e.g., the repository 125) based on the term may return a number of ads between an upper limit and a lower limit. In some implementations, more than one term may be used. For example, the number associated with a single term may indicate that the term may return a number of ads that is below the lower limit. In some implementations, one or more additional terms may be combined with the single term to increase the total number of ads that may be related to either term. For example, the single term may be associated with 50 advertisements, and a second term may be associated with 60 advertisements, but the combined number of ads associated with the first and second terms may be 110 advertisements.

In another example, the single term may be associated with a number of advertisements that exceeds the upper limit. In some implementations, one or more additional terms may be combined with the single term to reduce the total number of advertisements that may be associated with the combination of terms. For example, the first term may be associated with 10000 ads, while only 2000 ads may be associated with both the first term and the second term.

The term or terms determined at step 220 are used to perform a query in step 225. In some implementations, the query is executed against a repository of advertising content to retrieve a collection of selected advertisements. At step 230, the selected advertisements are provided to a user. In some implementations, the selected advertisements may be provided to the user as links to the advertiser's content, text content, graphic content, or combinations of these or any other advertising content. For example, web banners or hyperlinks relating to advertised products, goods, or services may be added to the requested page and presented to the user.

In other implementations, fewer or more steps can be performed. As another example, one or more steps can be performed repeatedly and/or in another order.

FIG. 3 illustrates a set of example pseudo-code 300 that can perform query prediction for serving contents such as advertisements. In some implementations, the pseudo-code 300 may be used to form collections of keyword terms that may be used to form queries that may be run against a repository of advertising content, such as the repository 125 of FIG. 1. Some exemplary contents of the pseudo-code will be described, and in other implementations, more or fewer code portions can be used.

The pseudo-code 300 here includes a section 305 that initializes a variable (total_ads) that holds the value for a number of ads that may relate to one or more search terms, and a variable (num_tokens) that holds the value for the number of tokens (e.g., search terms) used in a query.

At a section 310, a loop is defined. The loop is configured to execute once for every token in a collection of available tokens. For example, the collection of available tokens may be the collection of terms in a dictionary database 130, and/or the collection of terms in a cluster terms database 135. In the present example, the loop would execute once for each entry in the dictionary 130 and/or cluster terms database 135.

At a section 315, an object that represents a token (this_token) and an object that represents an additional token (extra_token) are initialized. The token objects represent elements of the collection of tokens (e.g., each object represents a single term or cluster). The token object is passed to a lookup subroutine to determine a number (num_hits) of advertisement hits that may be associated with the token. For example, the lookup subroutine may look up the token in a table such as the table 155 and return the number associated with the term in the table 155 (e.g., the number of ads that may relate to the term).

At a section 320, a determination is made to determine if the number of advertisement hits associated with the token is less than or equal to an upper limit (max_hits_per_token). If the number of hits is less than or equal to the upper limit, then the token is passed to a subroutine that combines the token with an additional token, sums the number of ads associated with the token and the additional token, and increments the a variable that tracks the number of tokens that have been used.

At a section 325, if the number of advertisement hits associated with the token is greater than an upper limit, then another determination is made. If no additional token has been found (extra_token==NULL), then the additional token object is set to hold an additional token (tok1). If the additional token object has been found to hold a token, then a section 330 is executed.

The section 330 defines a two-token query. A lookup subroutine is called to determine a number of hits associated with the token and the additional token. The two tokens are also added to a query object, and the number of ad hits determined from the two-token lookup is added to the number of ad hits determined by the single-token lookup. The additional token object is set to NULL, and the number of tokens used is incremented by two.

At a section 335, a determination is made. If the total number of ad hits is greater than or equal to a target number of ads (e.g., a lower limit, a minimum number of hits) or if the number of tokens used is greater than or equal to a limit of tokens that may be used, then the process ends.

At a section 340, another determination is made. If the total number of ad hits is less than a target number of ads or if the additional token object is null, then the additional token is added to the query.

In some embodiments, various triggers may be used to initiate building and/or updating a record such as the record 150 of FIG. 1. For example, the table may be built once, or built/updated in response to a user input. In another example, the table may be built and updated on an interval, such as once per week. In yet another example, the table may be built and updated when advertising content in a repository (e.g., the repository 125) changes, or when one or more pages (e.g., the page 115) changes.

In some embodiments, terms may be determined from sources other than a page or from data associated with the page. In addition to text data, terms may be determined from audio, video, or other media types. For example, a page may include a music (e.g., MP3) file or stream, and the music file's ID3 tag and/or the file's audio content may be analyzed to determine the song's album, artist, or other information. Advertisements for the band's website, music retailers, concert ticket vendors, or other related products, goods, and/or services may be associated with the page. In another example, an audio file or stream that includes spoken content may be transcribed using a speech recognition process, and the transcribed information may be analyzed to determine one or more keywords that may be used to associate ads with the content of the audio file (e.g., visible ads on the file's web page, commercials inserted into the audio file). In yet another example, a video file or stream may be analyzed to determine terms that may be used to associate advertisements with the video content. For example, speech recognition may be used to transcribe spoken content in the video's audio track, or a music identification process may be used to identify songs than may be in the video's sound track. Optical character recognition may be used to determine text, for example, to read billboards in the background of a video scene and link the detected text to advertisement content. Optical pattern recognition may be used to identify products and/or trademarks (e.g., a cola company's familiar ribbon logo, a fast food company's familiar arches) to associate advertisements with the products and/or trademarked logos shown in the video. For example, a page that shows an elephant logo or a donkey logo may be associated with ads for political candidates. Facial recognition may be used to identify persons in the video, and that information may be used to associate the video with advertisements relating to the identified person (e.g., ads for the person's business, products endorsed by the person).

In some embodiments, advertisements may be associated with videos by adding links, banner ads, pop-up ads, or any other advertisement form to the page that includes the video. In some embodiments, the advertising content may be included in the video file or stream. For example, ads associated with the content of a video may be spliced into the video as commercials.

Figure 4:
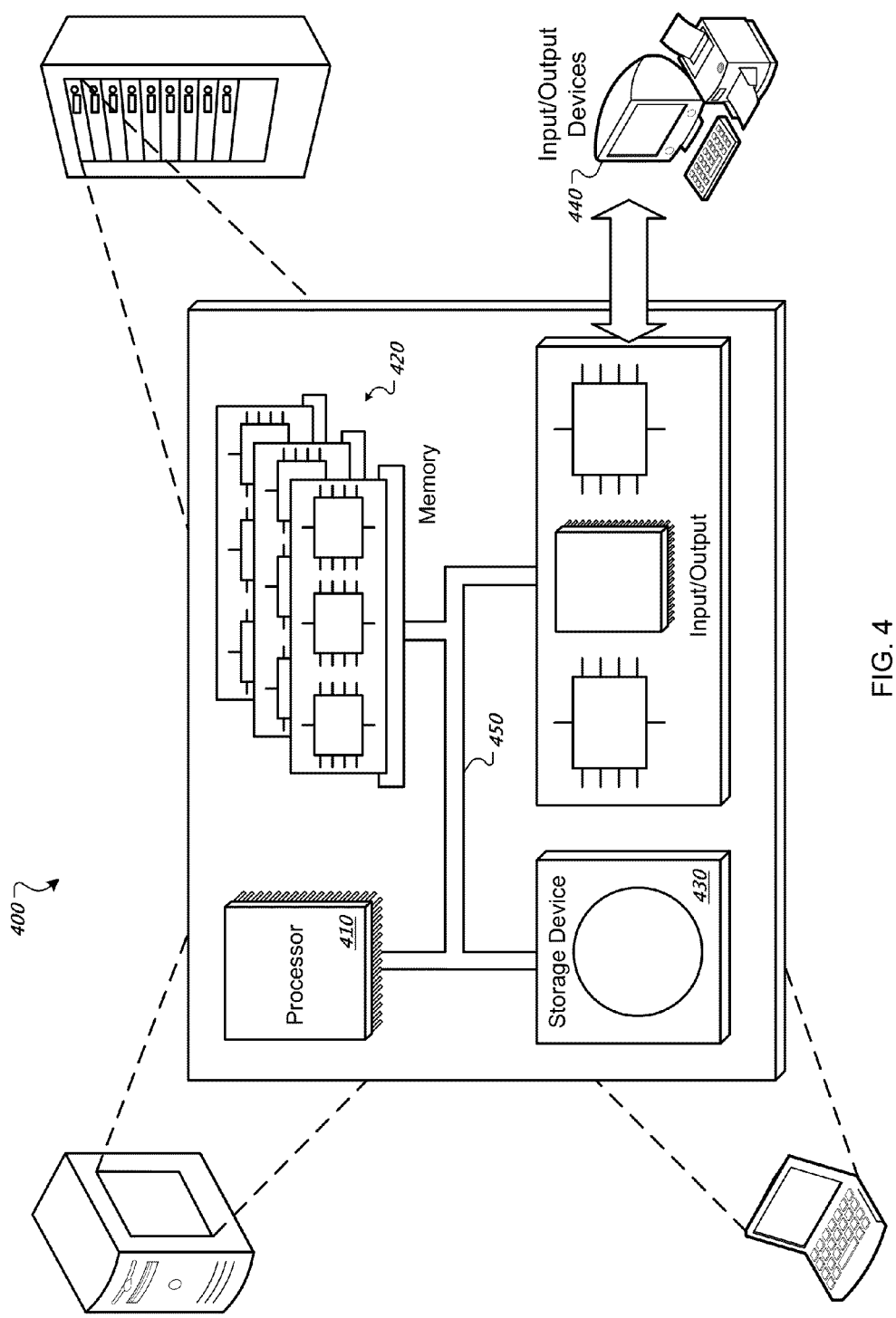
FIG. 4 is a block diagram of a computing system that can be used in connection with computer-implemented methods described in this document.

FIG. 4 is a schematic diagram of a generic computer system 400. The system 400 can be used for the operations described in association with any of the computer-implement methods described previously, according to one implementation. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, an optical disk device, or a tape device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method comprising:
   receiving, by a computer device, at least one term to be used in selecting content from a repository for publication;
   evaluating a record using the at least one term producing a result, the record including one or more query terms and corresponding values for numbers of documents in the repository that are responsive to a given query term, the result comprising a corresponding value for a first query;
   comparing, by the computer device, the corresponding value for the first query with at least one of a predetermined upper limit or a predetermined lower limit;
   determining, by the computer device and based on the comparison, a second query to be performed on the repository for selecting at least one of the content items, wherein determining the second query comprises one of:
   (i) when the corresponding value is greater than the predetermined upper limit, narrowing the first query to obtain the second query including identifying one or more additional terms to join with the at least one term including identifying one or more additional terms based on terms included in a document of the one or more documents that include the at least one term and wherein narrowing further includes creating the second query as a combination of the at least one term and the one or more additional terms; or
   (ii) when the corresponding value is less than the predetermined lower limit, broadening the first query to obtain the second query including identifying one or more additional terms to join with the at least one term including identifying one or more additional terms based on terms included in a document of the one or more documents that include the at least one term and wherein broadening further includes creating the second query as a combination of the at least one term or the one or more additional terms; and
   providing, by the computer device and responsive to the at least one term, selected content items that result from performing the second query.

2. The computer-implemented method of claim 1, wherein the record comprises a lookup table that associates each of multiple query terms with respective numbers for how many of the contents in the repository match the respective one of the multiple terms in a search.

3. The computer-implemented method of claim 2, further comprising generating the lookup table by performing searches using the multiple query terms.

4. The computer-implemented method of claim 3, wherein performing the searches comprises:
   obtaining the multiple query terms;
   for each of the multiple query terms, querying the repository; and
   recording the respective numbers for at least some of the multiple query terms in the lookup table.

5. The computer-implemented method of claim 4, further comprising:
   determining that the respective number of contents for at least a first one of the multiple query terms is less than the predetermined lower limit; and
   assigning a default value to the first one of the multiple query terms.

6. The computer-implemented method of claim 5, further comprising:
   for any of the multiple query terms not assigned the default value, forming combinations of the respective query term with each of the other ones of the multiple query terms;
   determining a number for how many of the contents of the repository match each of the respective combinations; and
   updating the lookup table with the determined number.

7. The computer-implemented method of claim 3, where the searches take into account a restriction on the selection of content for publication.

8. The computer-implemented method of claim 7, wherein the restriction is at least one selected from the group consisting of: a content-based restriction, a geographical restriction, a language-based restriction, or combinations thereof.

9. The computer-implemented method of claim 1, wherein evaluating the record comprises:
   looking up the received at least one term in the record and identifying the corresponding value in the record associated with the received at least one term; and
   determining whether the corresponding value is greater than the predetermined upper limit.

10. The computer-implemented method of claim 9, wherein the corresponding value is determined to be greater than the predetermined upper limit, further comprising:
    forming a combination of the received at least one term with at least another received term.

11. The computer-implemented method of claim 10, further comprising:
    using the combination in determining the second query.

12. The computer-implemented method of claim 11, further comprising:
  determining a total number of how many of the contents match respective terms being processed;
  causing an interruption upon determining that the total number is at least equal to the predetermined upper limit; and
  causing an interruption upon determining that the total number after processing a predetermined number of terms is lower than the predetermined lower limit.

13. The computer-implemented method of claim 1, wherein the repository is an advertisement repository, the documents are advertisements, and wherein the at least one term is obtained as relating to a publisher's page to select at least one of the advertisements in the repository for placement on the publisher's page.

14. A computer program product embodied in a non-transitory computer-readable storage medium and comprising instructions that when executed by a processor perform a method relating to selecting content for publication, the method comprising:
  receiving, by a computer device, at least one term to be used in selecting content from a repository for publication;
  evaluating a record using the at least one term producing a result, the record including one or more query terms and corresponding values for numbers of documents in the repository that are responsive to a given query term, the result comprising a corresponding value for a first query;
  comparing, by the computer device, the corresponding value for the first query with at least one of a predetermined upper limit or a predetermined lower limit;
  determining, by the computer device and based on the comparison, a second query to be performed on the repository for selecting at least one of the content items, wherein determining the second query comprises one of:
    (i) when the corresponding value is greater than the predetermined upper limit, narrowing the first query to obtain the second query including identifying one or more additional terms to join with the at least one term including identifying one or more additional terms based on terms included in a document of the one or more documents that include the at least one term and wherein narrowing further includes creating the second query as a combination of the at least one term and the one or more additional terms; or
    (ii) when the corresponding value is less than the predetermined lower limit, broadening the first query to obtain the second query including identifying one or more additional terms to join with the at least one term including identifying one or more additional terms based on terms included in a document of the one or more documents that include the at least one term and wherein broadening further includes creating the second query as a combination of the at least one term or the one or more additional terms; and
  providing, by the computer device and responsive to the at least one term, selected content items that result from performing the second query.

15. A computer system comprising:
  one or more processors;
  a repository including contents to be selected for publication;
  a record including one or more query terms and corresponding values for numbers of documents in the repository that are responsive to a given query term; and
  a non-transitory computer-readable storage medium comprising instructions that when executed generate:
    a content selection module that, upon receiving at least one term and before querying the repository, evaluates the record using the at least one term and produces a result comprising a corresponding value for a first query, compares the corresponding value for the first query with at least one of a predetermined upper limit or a predetermined lower limit, determines, based on the comparison, a second query to be performed on the repository for selecting at least one of the content items, wherein determining the second query comprises one of: when the corresponding value is greater than the predetermined upper limit, narrowing the first query to obtain the second query including identifying one or more additional terms to join with the at least one term including identifying one or more additional terms based on terms included in a document of the one or more documents that include the at least one term and wherein narrowing further includes creating the second query as a combination of the at least one term and the one or more additional terms, or when the corresponding value is less than the predetermined lower limit, broadening the first query to obtain the second query, wherein the content selection module provides, responsive to the at least one term, selected content items that result from performing the second query including identifying one or more additional terms to join with the at least one term including identifying one or more additional terms based on terms included in a document of the one or more documents that include the at least one term and wherein broadening further includes creating the second query as a combination of the at least one term or the one or more additional terms.

16. The computer system of claim 15, wherein the record comprises a lookup table that associates each of multiple query terms with respective numbers for how many of the contents in the repository match the respective one of the multiple terms in a search.

17. The computer system of claim 16, wherein the content selection module further generates the lookup table by performing searches using the multiple query terms.

18. The computer system of claim 17, wherein performing the searches comprises:
  obtaining the multiple query terms;
  for each of the multiple query terms, querying the repository; and
  recording the respective numbers for at least some of the multiple query terms in the lookup table.

19. The computer system of claim 18, wherein the content selection module further:
  determines that the respective number of contents for at least a first one of the multiple query terms is less than the predetermined lower limit; and
  assigns a default value to the first one of the multiple query terms.

20. The computer system of claim 19, wherein the content selection module further:
  for any of the multiple query terms not assigned the default value, forms combinations of the respective query term with each of the other ones of the multiple query terms;
  determines a number for how many of the contents of the repository match each of the respective combinations; and
  updates the lookup table with the determined number.

* * * * *

UNITED STATES PATENT AND TRADEMARK OFFICE
CERTIFICATE OF CORRECTION

| | | |
|---|---|---|
| PATENT NO. | : 8,732,185 B1 | Page 1 of 1 |
| APPLICATION NO. | : 13/607947 | |
| DATED | : May 20, 2014 | |
| INVENTOR(S) | : Nicholas Lynn and Alexander P. Carobus | |

It is certified that error appears in the above-identified patent and that said Letters Patent is hereby corrected as shown below:

On the first page of the Title Page, Column 2, item (56), OTHER PUBLICATIONS, line 2:
  Delete "Mar." and insert --May--

On page 2 of the Title Page, Column 1, item (56), OTHER PUBLICATIONS, line 2:
  Delete "Mar." and insert --May--

On page 2 of the Title Page, Column 1, item (56), OTHER PUBLICATIONS, line 3:
  Delete "scarchenginewatch" and insert --searchenginewatch--

On page 2 of the Title Page, Column 2, item (56), OTHER PUBLICATIONS, line 2:
  Delete "Mar." and insert --May--

Signed and Sealed this
Ninth Day of September, 2014

Michelle K. Lee
*Deputy Director of the United States Patent and Trademark Office*